March 5, 1968  G. R. SALISBURY III  3,371,467
SADDLE

Filed Oct. 26, 1964  4 Sheets-Sheet 1

INVENTOR.
GEORGE R. SALISBURY III
BY
ATTORNEY

March 5, 1968 G. R. SALISBURY III 3,371,467
SADDLE
Filed Oct. 26, 1964 4 Sheets-Sheet 2

INVENTOR.
GEORGE R. SALISBURY III
BY
Horace B. Van Valkenburgh
ATTORNEY

March 5, 1968 G. R. SALISBURY III 3,371,467
SADDLE
Filed Oct. 26, 1964 4 Sheets-Sheet 3
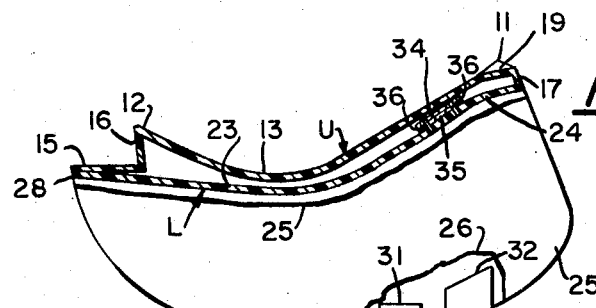
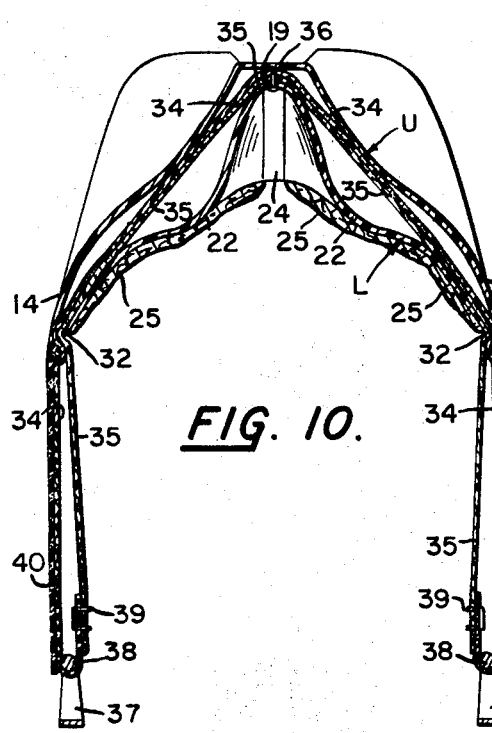
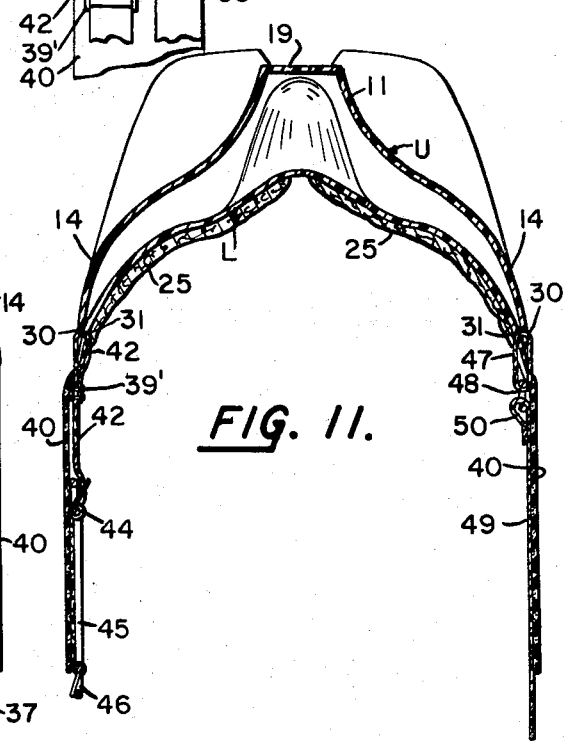
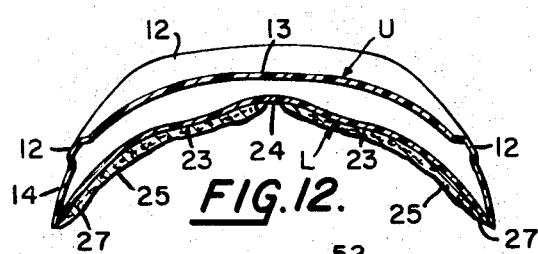
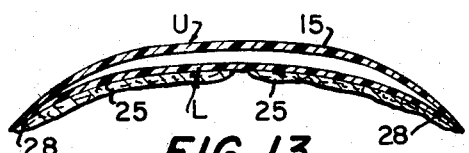
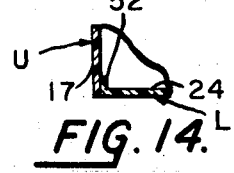
INVENTOR.
GEORGE R. SALISBURY III
BY
Horace B. Van Valkenburgh
ATTORNEY

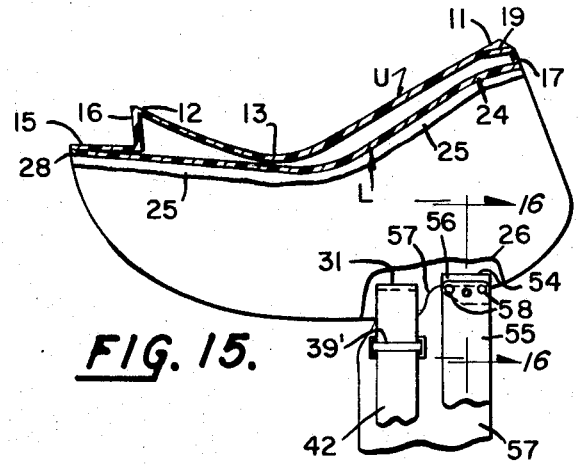
FIG. 15.
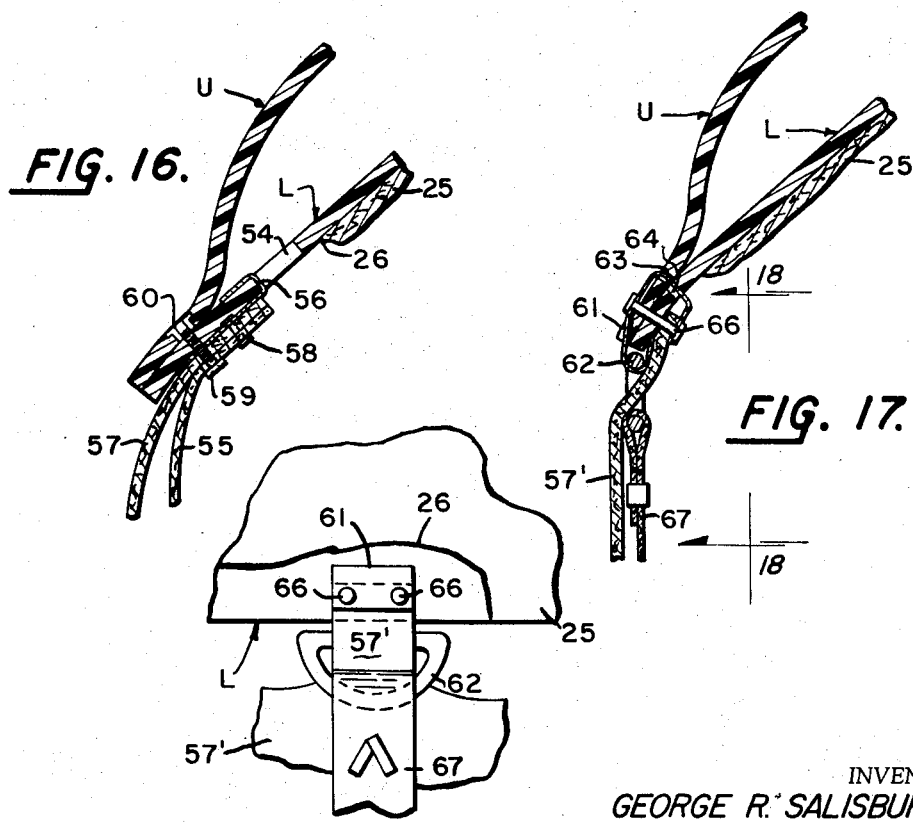
FIG. 16.
FIG. 17.
FIG. 18.
INVENTOR.
GEORGE R. SALISBURY III
BY
Horace B. Van Valkenburgh
ATTORNEY United States Patent Office 3,371,467
Patented Mar. 5, 1968

3,371,467
SADDLE
George R. Salisbury III, Carbon County, Wyo.
(Slater, Colo. 81653)
Filed Oct. 26, 1964, Ser. No. 406,380
18 Claims. (Cl. 54—44)

This invention relates to a saddle, and more particularly to a plastic saddle, preferably reinforced with fiberglass or the like.

Prior to the present invention, riding saddles have been made of leather placed over a wooden frame. These saddles have been quite heavy, weighing approximately forty or fifty pounds, making it awkward, difficult and sometimes impossible for some persons to place the saddle on a horse. In addition, it was necessary for the horse to carry this additional saddle weight.

Among the objects of this invention are to provide a novel saddle; to provide such a saddle which is formed of fiberglass or the like and plastic; to provide such a saddle which is particularly adapted to be molded in two pieces or shells; to provide such a saddle which is relatively light in weight, such as ten pounds or less; to provide such a saddle which has a degree of resilience to provide comfort for both the rider and the horse; to provide such a saddle in which a lower shell may be made to different contours to accommodate different types or sizes of horses; to provide such a saddle in which an upper shell may be made to different contours to accommodate persons of different builds and for different uses; to provide such a saddle having novel means for attaching the stirrup straps and fenders; to provide such a saddle, in one embodiment, wherein the stirrup strap extends across the saddle between the upper and lower shells; to provide such a saddle, in another embodiment, wherein the fenders and stirrup straps are removably attached to the saddle, as by clips; to provide such a saddle, in still another embodiment, wherein the fenders and stirrup straps are also removably attached to the saddle, as by means of a bendable strap; and to provide such a saddle which is relatively simple in construction and economical to manufacture.

Additional objects and the novel features will become apparent from the description which follows, taken in conjunction with the accompanying drawings, in which:

FIG. 9 is a longitudinal section, on an enlarged scale, taken along line 9—9 of FIG. 2;

FIG. 10 is a vertical section, taken along line 10—10 of FIG. 2, showing the attachment of the stirrups to the saddle;

FIG. 11 is a vertical section, taken along line 11—11 of FIG. 2, showing the attachment of the latigo to the saddle;

FIG. 12 is a vertical section, taken along line 12—12 of FIG. 2, showing the contour of the saddle at the rear edge of the seat;

FIG. 13 is a horizontal section, taken along line 13—13 of FIG. 2, showing the contour of the saddle at the rear skirt;

FIG. 14 is an enlarged, fragmentary, vertical section, similar to a portion of FIG. 9, and showing an alternative form for the forward meeting edges of the upper and lower shells;

FIG. 15 is a longitudinal section through a saddle of this invention, similar to FIG. 9, but showing an alternative stirrup connection;

FIG. 16 is an enlarged, vertical section, taken along line 16—16 of FIG. 15, showing further details of the stirrup connection;

FIG. 17 is an enlaged, vertical section, similar to FIG. 16, but showing a further alternative stirrup connection; and FIG. 18 is a fragmentary side elevation, taken along line 18—18 of FIG. 17.

Figure 1:
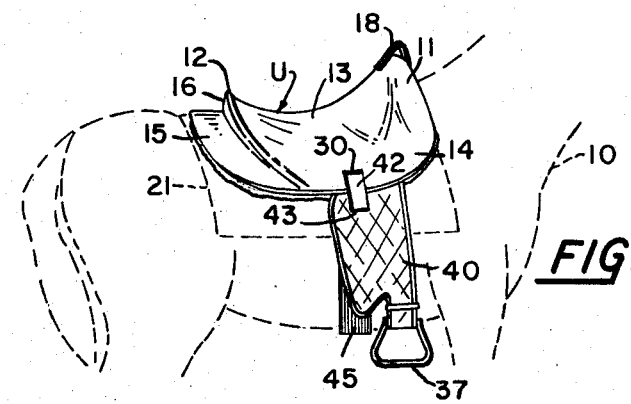
FIG. 1 is a side elevation of a saddle constructed in accordance with this invention mounted on a horse.
Figure 2:
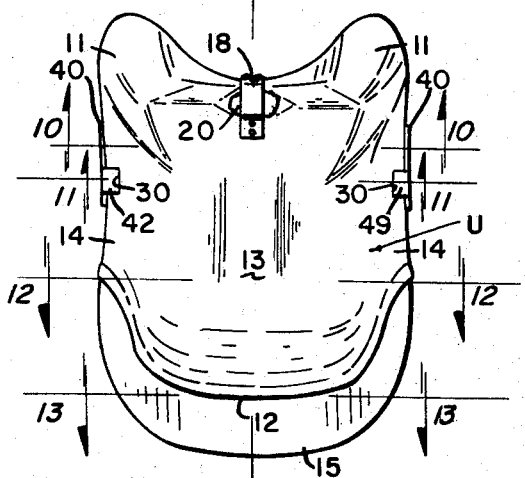
FIG. 2 is an enlarged, top plan view of the saddle of FIG. 1.
Figure 3:
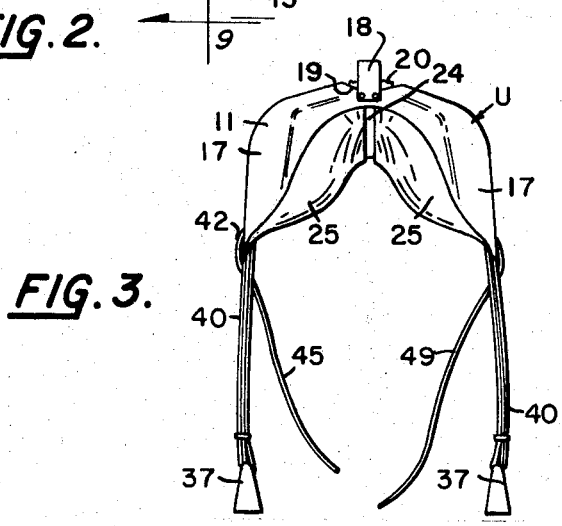
FIG. 3 is an enlarged, front elevation of the saddle of FIG. 1.
Figure 7:
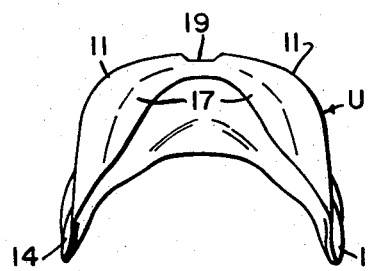
FIG. 7 is a front elevation of the upper shell of FIG. 5.
Figure 8:
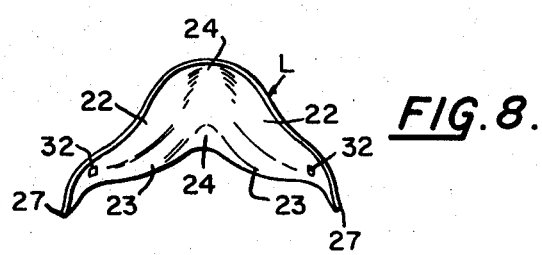
FIG. 8 is a front elevation of the lower shell of FIG. 6.

In accordance with this invention, a reinforced plastic saddle is provided having an upper shell U and a lower shell L, as seen in FIG. 3, which may be molded from a polyester boat resin, ABS resin, i.e. acrylonitrile butadiene styrene copolymer, or other molding plastic, reinforced with fiberglass or the like, the upper shell U being contoured to form a seat and the lower shell L being contoured to fit the back of a horse, such as horse 10 of FIG. 1. Upper shell U has hollow swells 11 at the forward end thereof and a hollow cantle 12 adjacent the rear thereof, with a seat 13 formed therebetween. The upper shell also has a side skirt 14 and a rear skirt 15, the latter extending from the rear flange 16 of cantle 12 and formed integrally therewith. A flange 17, as in FIG. 7, forms the front of the swells 11, with the lower edge of flange 17 corresponding to the contour of the front upper edge of the lower shell L, to which it is attached, as in a manner described later. A handle strap 18, as in FIGS. 1-3, which may be readily grasped for carrying the saddle or for easier handling of the saddle when placing it on a horse, is conveniently attached, as by rivets, as shown, to the upper end of the swells 11, as in a notch or depression 19 of FIG. 7 formed in the swells. A small pad 20, as of sheepskin, as in FIGS. 2 and 3, may be secured by adhesive in notch 19, to provide a soft surface to be engaged by the fingers of the user when inserting them under the handle strap, handle 18 and pad 20 being omitted in FIG. 9 for greater clarity of illustration of notch 19. A blanket 21, as in FIG. 1, may also be used with the saddle, if desired. Conveniently, the handle 18 is located in the position of the horn of the conventional saddle. Of course, a conventional horn may be substituted for the handle, if desired, and formed integrally with or attached to the upper shell U. While a particular shaped upper shell has been shown, it will be understood that the contour thereof may be varied, depending on the use to which the saddle is to be put. Also, if desired, the contour of the upper shell may be varied to fit the anatomy of the person who will be using the saddle.

Figure 4:
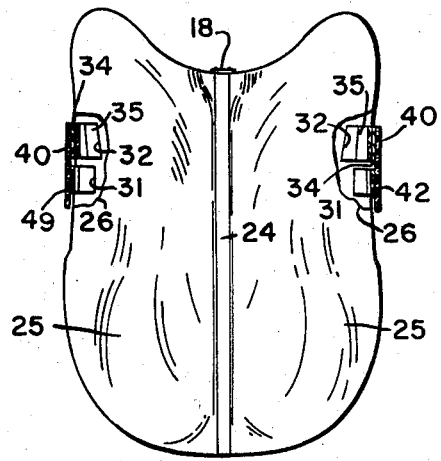
FIG. 4 is an enlarged, bottom plan view of the saddle of FIG. 1.

The lower shell L is contoured to fit the back of the horse and on each side has a convex front portion 22, adapted to fit onto the withers, and a convex rear portion 23, adapted to fit onto the back of the horse, with a central ridge 24 forming a tunnel extending longitudinally of the shell and being sufficiently high to clear the backbone of the horse, particularly between front portions 22. In addition, as in FIGS. 3 and 4, the underside of the lower shell L may be provided with a pair of sheepskin pads 25, seen also in FIG. 9, which will rest on the horse's back but are separated at center ridge 24, further assuring that the saddle in no way engages the backbone of the horse. Pads 25 are provided with cutouts 26, as in FIG. 4 to accommodate the stirrup straps and latigo, as described later. Outwardly of each convex portion 22 and 23, the lower shell has downwardly and outwardly flaring sides 27, the edges of which are curved to conform to and attached to the underside of skirts 14. Also, the rear edge 28 of the lower shell L, into which ridge 24 merges, at the position of FIG. 13, is curved to conform to the underside of the rear skirt 15 of the upper shell U, to which it is attached. Thus, the peripheral edge of lower shell L is shaped so as to conform to the shape of the peripheral edge of the upper shell, so that the two edges will mate when placed together and may be attached together, as by heat welding, or by a suitable resin bonding agent.

The upper and lower shells are conveniently formed by spraying a mixture of fiberglass and resin against the inside of a suitable mold, until the desired thickness is obtained, or may be formed by machine through use of suitable dies. A suitable coloring material may be first sprayed into the mold for the upper shell, so that the exposed surface thereof will have a desired color, or the coloring material may be mixed with the resin, so that the upper shell will be colored throughout. Since the lower is almost completely covered by the pads 25, coloring of the lower shell may be dispensed with, but can be done if desired. The molds for the shells may be formed of metal, wood, or even plastic, except for machine operations. The lower shell presents little difficulty in removal from the mold, but the upper shell is preferably contoured, particularly front swell flange 17 and rear cantle flange 16, that removal from the mold is facilitated. Thus, front flange 17 is preferably generally parallel to, or inclined away from, rear cantle flange 16, to facilitate such removal. It will be noted that rear cantle flange 16 forms a much greater angle with the front of the cantle than in the normal saddle, as will be evident from FIG. 9. Also, the sides of cantle 12 preferably flare outwardly from each other, as the cantle merges with the seat, as will be evident from FIG. 12.

Figure 5:
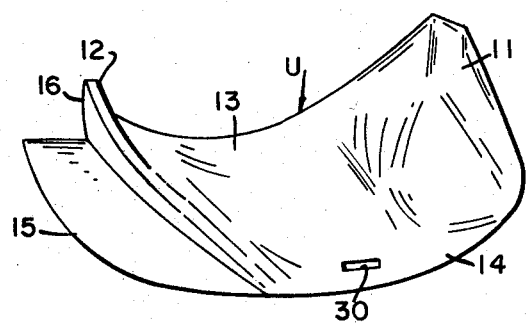
FIG. 5 is an enlarged, side elevation of an upper shell of the saddle of FIG. 1.
Figure 6:
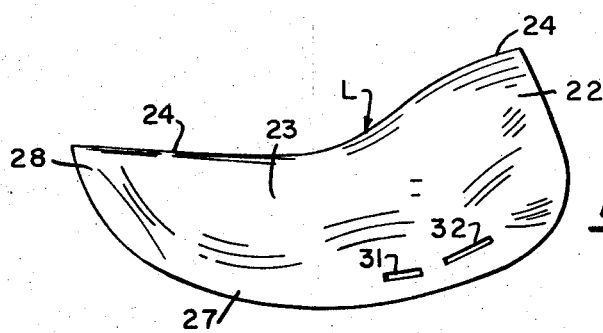
FIG. 6 is an enlarged, side elevation of a lower shell of the saddle of FIG. 1.

To facilitate attachment of the latigo, the upper shell is provided with a single slot 30 on each side, as in FIG. 5, and the lower shell with a corresponding slot 31 on each side, as in FIG. 6. To facilitate installation of the stirrup straps, the lower shell is provided with a wider slot 32 at each side, forwardly of the slots 31 and angular in position, if desired, as shown. Slots 30 may be formed in the upper shell and slots 31 and 32 may be formed in the lower shell during molding, or may be cut therein after molding.

In accordance with this form of the invention, a pair of stirrup straps 34 and 35 are disposed between the shells, and are supported by the lower shell, the upper center thereof resting on ridge 24, as in FIG. 10, and being attached thereto, as by a pair of rivets 36 of FIG. 9. The stirrup straps extend downwardly in spaced relation to the convex portion 22 and across the sides 27 for passage through slots 32 and downwardly to stirrups 37, passing beneath the lower edge of the saddle. Each end of outer stirrup strap 34 extends beneath a pintle 38 of the corresponding stirrup, then upwardly on the inside to the corresponding end of the inner stirrup strap 35, to which it is adjustably attached by a conventional pronged connector 39, for the accommodation of which end of each stirrup strap is provided with a longitudinally spaced series of holes. A fender 40, of plastic or of leather, is conveniently attached, as by sewing, to the outer stirrup strap 34, at each side.

The stirrup straps 34 and 35 are most conveniently attached to the lower shell before the shells are attached together; thus, the stirrup straps must be kept out of the way when the shells are attached together, and for this reason, the shells of this form are most conveniently attached by a resin adhesive which is spread on each of the edges to be joined and the edges then clamped together, with any excess adhesive which is squeezed out between the edges being wiped off. At the area of slots 30 and 31, the adhesive resin is preferably applied generously, so that slots 30 and 31 will become a single slot, for attachment of the opposite ends of the cinch on each side. On one side, a strap 42 is looped through the slots 30 and 31 and also through a slot 43 in fender 40, as in FIGS. 1 and 11, to an adjustable connector 39', with one end extending to a buckle 44 by which it is attached to a cinch band 45, the opposite end of which is provided with a ring 46. On the opposite side, a strap loop 47, the ends of which are attached together, as by sewing, with a D-ring 48 or the like within the loop, is similarly looped through slots 30 and 31 and also through a slot 43 in fender 40 on that side. Latigo strap 49 is attached, at one end, as by a sewed loop 50, to ring 48 and is threaded alternately through rings 46 and 48, tightened thereon and tied, in a conventional manner.

In the event that any difficult is encountered in attaching the front edges of the upper and lower shells together, because flange 17 is substantially at right angles to the front edge of the lower shell, the alternative construction illustrated in FIG. 14 may be utilized, in which the front edge of ridge 24, as well as the remainder of the front edge of the lower shell, is molded with an upstanding flange 52, which provides additional surface area for an adhesive which attaches flange 52 to the inside of flange 17. Of course, when the upper and lower shells are attached together by heat welding, flange 52 of FIG. 14 may also prove desirable.

It will be noted from FIGS. 9–13 that the upper and lower shells are separated except along their peripheral edges. Thus, due to the inherent flexibility of the shells, the upper shell will flex or "spring" on the lower shell, providing additional comfort for the rider.

In the event that the attachment of the stirrup straps to the lower shell before the shells are attached together proves inconvenient, particularly when the edges of the shells are attached by heat welding, the shells may be first attached together and the stirrup straps, with a narrow metal plate at the center and provided with holes for attaching screws, slipped through one slot 32 and out the opposite slot 32, to position the metal plate above holes previously drilled through ridge 24. Then, attaching screws may be inserted through these holes and tightened in the corresponding holes in the metal plate. Such a procedure can, however, be avoided by using either of the alternative arrangements shown in FIGS. 15–18, for attaching the stirrup straps. The saddles of FIGS. 15–18 comprise an upper shell U and a lower shell L, similar to the shells described previously, except a slot 54 is provided in the lower shell for attachment of stirrup strap 55 which extends downwardly to a loop for the stirrup (not shown), the opposite end of the loop being adjustably attached to the strap 55 in a conventional manner, such as similar to that previously described. Slot 54 receives a U-shaped metal clip 56 to which the stirrup strap 55 and a fender 57 are attached, as will be described below. Since clip 56 may have a lesser width than the stirrup strap, slot 54 may have a lesser width than slot 32 of FIG. 6, but coinciding slots 30 and 31 in the shells may be similar to the corresponding slots of FIGS. 5 and 6, for attachment of the latigo in a similar manner, as shown generally in FIG. 15. As indicated, the fender 57 and stirrup strap 55 are attached to clip 56, as by a pair of spaced rivets 58. To attach the stirrup strap and fender to the saddle, clip 56 is merely placed in slot 54 in the lower shell, as shown in FIG. 16, and a screw 59 is inserted through a hole provided for that purpose in strap 55, fender 57 and clip 56 for threadably engaging a screw head 60 which is placed in a countersunk hole drilled for that purpose in the shells. Thus, a very easy and convenient method of attaching the fender and stirrup strap to the saddle is provided, since the fender and stirrup strap may be removed from the saddle, when desired, for replacement and/or repair purposes, simply by removing screw 59.

Another alternative attachment for the stirrup strap and fender is shown in FIGS. 17 and 18, in which a metal strap 61 extends around the upper portion of a D-ring 62, through a small slot 63 in upper shell U and a corresponding small slot 64 in lower shell L, to a position overlapping the first end of the strap, with the upper end of a fender 57' extending through the D-ring and between the ends of strap 61, the strap being secured by a pair of spaced rivets 66, each extending through the strap, the fender and a hole drilled through the upper and lower shells, and for which a pair of bolts or other fastening device may be substituted, if desired. A stirrup strap 67, conveniently conventional in construction, is attached to the lower portion of the D-ring 62.

For the foregoing, it will be evident that a saddle constructed in accordance with this invention fulfills to a marked degree the requirements and objects hereinbefore set forth. A saddle has been provided which may be molded from plastic reinforced with fiberglass or the like, comprising upper and lower shells which are welded or adhered together along their peripheral edges, the lower shell being shaped to accommodate the contour of the horse's back and the upper shell being spaced from the lower shell to provide resilience which adds to the comfort of both the rider and the horse. The saddle is quite light in weight, weighing less than ten pounds without stirrups, fenders and latigo. It is readily apparent that the lower shell may be made to different shapes for different types of horses, while the upper shell may be made to different shapes for different uses and for different persons. In one embodiment, the stirrup strap extends across the saddle, between the upper and lower shells, and is supported by the lower shell. In an alternative embodiment, the fenders and stirrup straps are riveted to a U-shaped clip, which may be attached by a single screw to both shells. In a further embodiment, the fenders and stirrup straps are attached to both shells by a bendable metal strap at each side. An advantage of the alternative embodiments is that the edges of the upper and lower shells may be attached together, as by heat welding or an adhesive, prior to attachment of the stirrup straps to the lower shell.

Although the saddle illustrated is a Western style saddle, it will be evident that an English style saddle, or other types or styles, may be constructed in a similar manner. In addition, either or both of the shells may be formed from two or more sections produced separately but attached together or to the other shell, as by an adhesive or heat welding. For instance, the upper shell may be divided into two sections at the cantle.

Although a preferred form of this invention has been illustrated and described and alternative embodiments have been shown, it will be understood that various changes and variations may be made and that the features of one embodiment may be incorporated in other embodiments, all without departing from the spirit and scope of this invention.

What is claimed is:
1. A saddle comprising:
   a lower shell adapted to rest on the back of a horse;
   an upper shell having a seat for a rider and spaced from said lower shell over a substantial portion thereof; and
   means joining said shells together around the edges thereof.
2. A saddle, as set forth in claim 1, wherein said upper and lower shells are formed of a plastic reinforced by fiberglass and the like.
3. A saddle, as set forth in claim 2, wherein said upper shell is attached to said lower shell around the peripheral edges thereof by one of heat welding and an adhesive.
4. A saddle, as set forth in claim 1, wherein the contour of said lower shell includes a longitudinal tunnel to accommodate the backbone of a horse.
5. A saddle, as set forth in claim 4, wherein said upper shell has a contour corresponding to a Western type saddle.
6. A saddle, as set forth in claim 5, wherein:
   said upper shell is provided with swells and a downwardly extending flange at the front thereof; and
   the front edge of said lower shell is provided with an upwardly extending flange for readier attachment to said upper shell.
7. A saddle, as set forth in claim 1, wherein said lower shell is provided with a slot at each side, spaced from the lower edge and at a forward position, for accommodating stirrup supporting means.
8. A saddle, as set forth in claim 7, wherein said stirrup supporting means includes:
   at least one stirrup strap extending through said slots and between said upper and lower shells and over said lower shell, said strap being supported by said lower shell and being constructed and arranged so that stirrups may be attached to the lower ends thereof.
9. A saddle, as set forth in claim 8, wherein said stirrup strap is attached to the top of said lower shell between said slots.
10. A saddle, as set forth in claim 7, wherein said stirrup supporting means includes:
    a pair of removable U-shaped clips, each extending into one of said slots;
    a stirrup strap attached to each said clip; and
    means for attaching said clip to said shells.
11. A saddle, as set forth in claim 10, wherein said means for attaching said clip to said shells comprises a threaded fastening device.
12. A saddle, as set forth in claim 7, further including:
    a second pair of slots in said bottom shell on opposite sides thereof and rearwardly of said first pair of slots;
    a pair of slots in said top shell corresponding in position to said second pair of slots in said bottom shell; and
    cinch attaching means extending through said corresponding pairs of slots.
13. A saddle, as set forth in claim 1, wherein said lower shell is provided with a first slot on each side adjacent the front thereof and a second slot on each side rearwardly of said first slot;
    said upper shell is provided with a first and second slot on each side corresponding to the position of said first and second slots of said lower shell;
    stirrup supporting means extending through said pairs of first slots at each side; and
    cinch attaching means extending through each pair of corresponding second slots.
14. A saddle comprising:
    a lower shell adapted to rest on the back of a horse, said lower shell including a longitudinal tunnel to accommodate the backbone of said horse, and provided with a pair of slots at each side adjacent the lower edge and at a forward position, including a first slot on each side and a second slot on each side rearwardly of said first slot;
    an upper shell having a contour corresponding to a Western type saddle, having a seat for a rider, swells and a downwardly extending flange at the front thereof, a slot at each side adjacent the lower edge and corresponding in position to said second slots in said lower shell, said upper and lower shells being formed of a plastic reinforced by fiberglass and the like and spaced from said lower shell over a substantial portion thereof, said upper shell being attached to said lower shell around the peripheral edges thereof by an adhesive;
    at least one stirrup strap extending through said first slots of said lower shell and between said upper and lower shells and over said lower shell, said strap being supported by said lower shell and attached to the top of said lower shell, said strap being constructed and arranged so that stirrups may be attached to the lower ends thereof; and cinch attaching means extending through said corresponding pairs of slots.

15. A saddle comprising:

a lower shell adapted to rest on the back of a horse, said lower shell including a longitudinal tunnel to accommodate the backbone of said horse, provided with a pair of slots at each side adjacent the lower edge and at a forward position, including at each side a first slot and a second slot rearwardly of said first slot;

an upper shell having a contour corresponding to a Western type saddle, having a seat for a rider, swells and a downwardly extending flange at the front thereof, a pair of slots at each side, corresponding in position to said first and second slots of said lower shell, said upper and lower shells being formed of a plastic reinforced by fiberglass and the like, said upper shell being attached to said lower shell around the peripheral edges thereof by one of heat welding and an adhesive;

stirrup supporting means extending through each pair of first slots at each side; and cinch attaching means extending through each pair of corresponding second slots.

16. A saddle comprising:

a lower shell adapted to rest on the back of a horse;

an upper shell having a seat for a rider and spaced from said lower shell over a substantial portion thereof;

means joining said shells together around the edges thereof;

said lower shell being provided with a first slot on each side adjacent the front thereof and a second slot on each side rearwardly of said first slot;

said upper shell being provided with a first and second slot on each side corresponding to the position of said first and second slots of said lower shell;

a pair of D-rings;

a stirrup strap attached to each said D-ring;

a pair of metal straps, each said metal strap extending through one of said D-rings and the corresponding pair of said first slots;

interconnecting means extending through the ends of said metal strap and said upper and lower shells; and cinch attaching means extending through each pair of corresponding second slots.

17. A saddle, as set forth in claim 16, wherein said interconnecting means comprises a pair of rivets.

18. A saddle, as set forth in claim 16, wherein a fender extends through each said D-ring and is attached to said metal strap by said interconnecting means.

References Cited

UNITED STATES PATENTS

| | | | |
|---|---|---|---|
| 2,153,326 | 4/1939 | Crouter | 54—44 |
| 3,157,976 | 11/1964 | Ellsworth | 54—44 |
| 3,258,894 | 7/1966 | Hoaglin | 54—44 |

HUGH R. CHAMBLEE, *Primary Examiner.*

SAMUEL KOREN, *Examiner.*